US006675299B2

United States Patent
Porter et al.

(10) Patent No.: US 6,675,299 B2
(45) Date of Patent: *Jan. 6, 2004

(54) METHOD AND APPARATUS FOR DOCUMENT MANAGEMENT UTILIZING A MESSAGING SYSTEM

(75) Inventors: Jack Edward Porter, Pleasonton, CA (US); Geoffrey Leroy Brimhall, San Franciso, CA (US); William Montgomery Crane, Sunnyvale, CA (US); Liam Patrick O'Gorman, San Franciso, CA (US)

(73) Assignee: iManage, Inc., Foster City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/201,328

(22) Filed: Nov. 30, 1998

(65) Prior Publication Data

US 2002/0120858 A1 Aug. 29, 2002

Related U.S. Application Data

(63) Continuation of application No. 08/711,065, filed on Sep. 9, 1996, now Pat. No. 5,845,067.

(51) Int. Cl.[7] .............................................. G06F 12/14
(52) U.S. Cl. ...................................... 713/200; 713/201
(58) Field of Search ................................. 713/200, 201

(56) References Cited

U.S. PATENT DOCUMENTS

| 4,757,533 | A | * | 7/1988 | Allen et al. ................... 380/25 |
| 5,144,557 | A | | 9/1992 | Wang et al. |
| 5,163,147 | A | | 11/1992 | Orita |
| 5,263,157 | A | | 11/1993 | Janis |
| 5,263,165 | A | | 11/1993 | Janis |
| 5,315,504 | A | | 5/1994 | Lemble |
| 5,414,844 | A | | 5/1995 | Wang |
| 5,418,942 | A | | 5/1995 | Krawchuk et al. |
| 5,423,034 | A | | 6/1995 | Cohen-Levy et al. |
| 5,613,134 | A | | 3/1997 | Lucus et al. |
| 5,845,067 | A | * | 12/1998 | Porter et al. ................. 713/200 |

OTHER PUBLICATIONS

Karen M Shegda, "Competitive Outlook: Document Management Software", Datapro Information Services Group, Apr. 1994, pp. 051–062.

Steven C.M. Chen, The Document Masters: PC DOCS, Saros, and SoftSolutions, PC Magazine, Jun. 14, 1994, pp. 316–317.

"Document Management", SoftSolutions Technology Corporation Literature Sales, 1993.

"PC DOCS Open Setting Standard For Document Management", PC DOCS, Inc., Literature Sales.

(List continued on next page.)

*Primary Examiner*—Ly V. Hua
(74) *Attorney, Agent, or Firm*—Blakely, Sokoloff, Taylor & Zafman LLP

(57) ABSTRACT

The content of a document is stored in a file system, while the profile of the document is stored in a messaging system. The profile of the document is accessed upon request, and the document content is accessed based upon the content of the profile.

19 Claims, 15 Drawing Sheets

OTHER PUBLICATIONS

Saros Mezzanine, "SAROS Product Overview", Saros Corporation Literaure Sales.

"Proposed Features For Mezzanine/FilesShare 3.0", Saros Corporation Literature Sales, pp. 1–3.

"Mezzanine Saros", Document Manager, LAN, The Local Area Network Magazine, Jan. 1991.

Karyl Scott, "Client–Server Application Eases 'Electronic Paperwork'", Data Communications, Sep. 1990.

Susan Breidenbach, "Saros Combines Database, Management", Mezzananine Enables Applications For Structured Data, LAN Times, vol. VII, Issue XIV, Nov. 19, 1990.

Steve Higgins and Dale Lewallen, "Windows, OS/2 Tools Form Keystone Of Office Solution", PC Week, Mar. 5, 1990.

The Next Generation Of Systems Thinking, Saros Corporation, Corporate Backgrounder, May 1990, pp. 1–8.

File Net Worldwide Headquarters, Web page downloaded from http/www.filenet.com.

"Put The Power of Lotus Notes To Work", Lotus Symposium, 1996, Lotus Corporation Literature Sales.

"Lotus Notes And The Internet", A Lotus Development Corporation Strategic White Paper, Jan. 1996, pp. 1–23.

Bill Zoellick, "The Barbarians Across The Rhine", Document Software Strategies Analysis, Feb. 18, 1997, vol. 2, No. 8, pp. 1–3.

Press Release, Internet, "Lotus Announces Document Management Solution For The Net", Mar. 13, 1997, pp. 1–3.

"Domino Doc Product Overview", Internet, Mar. 13, 1997, pp. 1–2.

"Domino Doc Document Management For The Age Of The Web", Domino Doc Datasheet, Internet, Mar. 13, 1997, pp. 1–3.

"Domino doc Architecture", Internet, Mar. 13, 1997, pp. 1–2.

"Screen Shot–ODMA Integration", Internet, Mar. 13, 1997, pp. 1–2.

"Screen Shot–Intuitive User Interface", Lotus Domino Doc., Internet, Mar. 13, 1997, p. 1.

"Screen Shot–File Cabinet Creation", Lotus Domino Doc., Internet, Mar. 13, 1997, pp. 1–2.

"Screen Shot–File Cabinet Invites And Notification", Lotus Domino Doc., Internet, Mar. 13, 1997, pp. 1–2.

"Screen Shot–Check–Out", Lotus Domino Doc., Internet, Mar. 13, 1997, p. 1.

* cited by examiner

METHOD AND APPARATUS FOR DOCUMENT MANAGEMENT UTILIZING A MESSAGING SYSTEM

Continuation of prior application Ser. No. 08/711,065, filed Sep. 9, 1996, now U.S. Pat. No. 5,845,067.

BACKGROUND OF THE INVENTION

1. Field of the Invention

The present invention relates to document management systems. More specifically the present invention relates to a method of managing and controlling documents through the use of a messaging system.

2. Description of the Related Art

In today's global market place, timely access to crucial business information has become a powerful and necessary strategic weapon. As more and more documents and items of data have to be filed and found, modern document processing systems have to be fast and accurate.

In a conventional document management system, each document is sub-divided into two parts, the content of the document and the document profile. The content of the document is the actual information contained within the document itself. The document profile contains the attributes of the document including its title, author, and the date saved. The document content and the document profile are typically stored separately.

FIG. 1 is an illustration of a prior art document management system 170. A file system 100 contains the document contents 110 which are stored as individual files. The file system 100 is a conventional computer-implemented file system such as the file system provided by Microsoft Windows® or Apple® Macintosh® Finder operating systems. A conventional database 120 contains the document profiles 140 corresponding to document contents 110, as well as security information 130. Database 120 is a conventional structural information system storing information as a set of records and attributes or fields. The security information 130 represents access control information to determine whether a particular computer user has permission rights to access the document profile 140 and/or document contents 110. The conventional document manager 150 accesses the document profile 140 and the document content 110 and allows the client 160 access to the composite document formed by the combination of a document profile 140 and document content 110 if corresponding security information 130 so permits.

The conventional document management system 170 uses a security system that is separate from the operating system security system 180. The security information 130 is typically stored in the database 120, while a security monitor 170 resides within the document manager 150. In order to verify access to a certain document, user access information must be retrieved from the security information 130, and passed on to the security monitor 170. The security monitor 170 then determines whether the user has access to the particular document.

When a user operating a client computer system logs into a server computer system, the server computer system requires that the user have access authorization. When the user logs into a conventional document management system 170 located on a server computer system, a first user identifier and access code or password is required. This information is checked against operating system security 180 to authorize the user log-in. Next, the user must log into the document manager 150 using a second user identification and access code or password. This user-entered information is checked against the security information 130 in the database, maintained by the security monitor 170 of the document manager 150.

Thus, once a user operating a client computer system logs into a server computer system, he or she has to go through an additional hurdle of logging into the security system of the document manager 150. This two-step log-in procedure creates problems when the access rights are changed or when, for example, new users must be added to both security systems. Multiple sets of security information create configuration control and consistency problems and slow down user access to the document management system 170.

Therefore, it is apparent that a need exists for a document management system which does not use a separate database, and which does not utilize multiple security systems.

SUMMARY OF THE INVENTION

An improved document management system using a messaging system and a single access security system is disclosed.

The content of a document is stored in a file system, while the profile of the document is stored in a messaging system. The profile of the document is accessed upon request, and the document content is accessed based upon the content of the profile.

Other objects, features and advantages of the present invention will be apparent from the accompanying drawings and from the detailed description.

BRIEF DESCRIPTION OF THE DRAWINGS

The present invention is illustrated in the following drawings, in which known structures are shown in block-diagram form for clarity. These drawings are for explanation and for aiding the reader's understanding. The present invention should not be taken as being limited to the preferred embodiments and design alternatives illustrated.

DETAILED DESCRIPTION

The present invention relates to a method and apparatus for document management. In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown in detail in order not to unnecessarily obscure the present invention.

Figure 1:
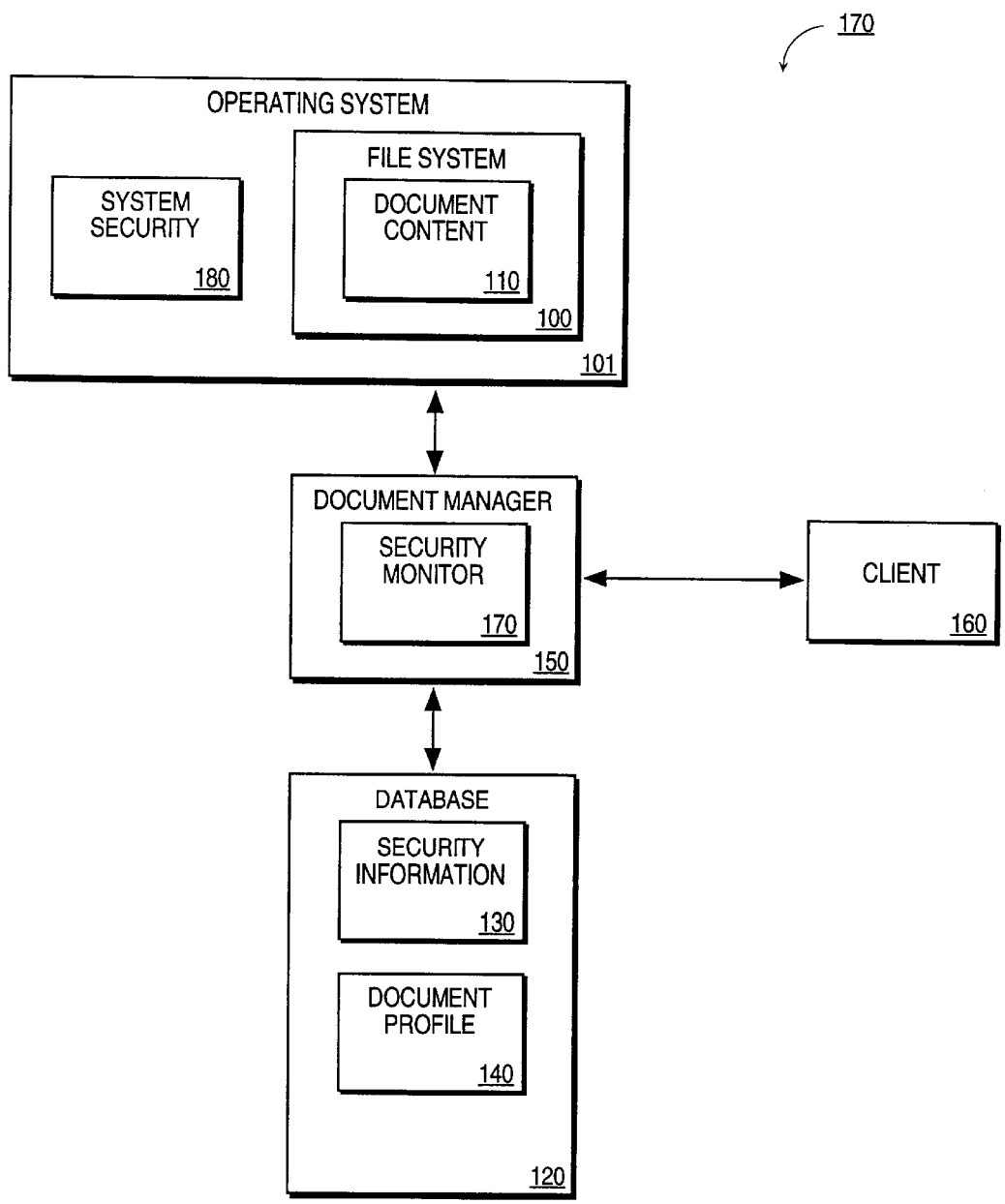
FIG. 1 is a block diagram of a prior art document management system.
Figure 2:
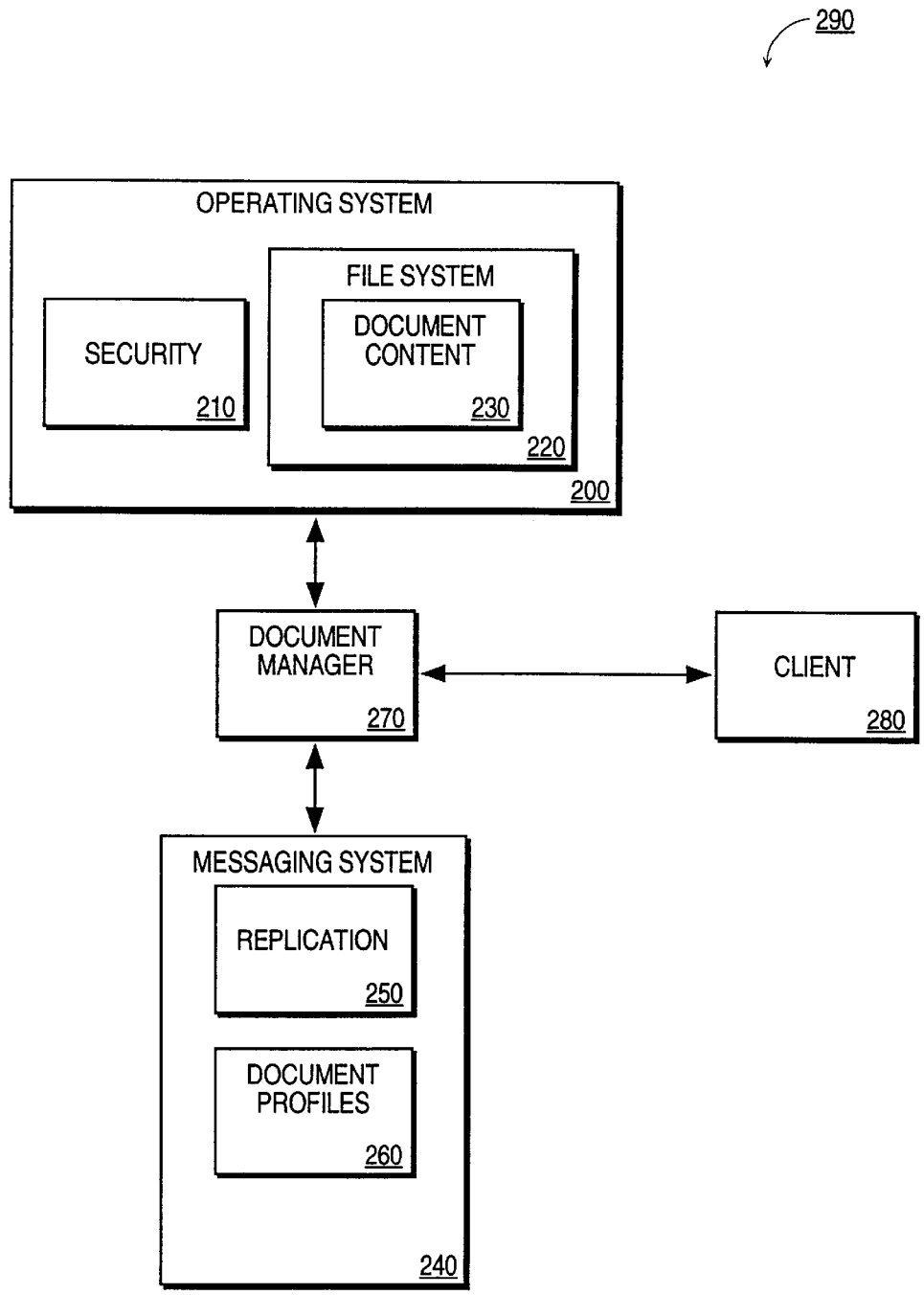
FIG. 2 a block diagram of the present document management system.

FIG. 2 is a block diagram of the document management system 290 of the present invention. The document management system 290 of the present invention consists of a document manager 270 which is connected to the operating system 200. The operating system 200 used with the present invention may include the Windows operating system family. The Windows operating system as used in the present application includes Windows NT, Windows 95. The operating system (O/S) 200 contains the conventional operating system security 210. This conventional operating system security 210 is built in to the conventional O/S. For example, in Microsoft Windows NT, a built in security system is provided which requires a password in order for a user to log into the system and thereby gain access to files and the network. Similarly, many other conventional operating systems require a password or access code to allow users operating a client computer system to log in. This security 210 is used by the document manager 270 of the present invention as will be described in more detail below.

The operating system 200 also contains the file system 220. File system 220 is a conventional data management and date storage system. The file system 220 contains document content 230. Document content 230, as described above, comprises the information contained within the document itself. Document content 230 is described below in more detail in connection with FIG. 7.

The document manager 270 of the present invention is also connected to a conventional messaging system 240. The messaging system 240 may, for example, be Microsoft Exchange™ which integrates e-mail with centralized management and communication capabilities. Alternately, for example, the messaging system 240 may be Lotus Notes developed by Lotus Corp.™, cc: mail or any other conventional messaging system that incorporates message communication, message storage and the ability to attach information about a message to the message.

The conventional messaging system 240 contains the document profiles 260. As described above, one document profile is associated with each document content 230 stored in the file system 220. Each document profile 260 contains the document attributes including title, location of the document, the author of the document and assorted other information about the document. The document profile 260 is described in more detail with respect to FIG. 7. A user operating a client 280 connects to the document management system 290 through the document manager 270 in order to use the document management system 290 of the present invention. The document manager 270 is described in more detail below.

Some conventional messaging systems 240 may also contain a replication module 250 that performs replication. Replication is the copying of the document profile 260 within the messaging system 240 and transmitting the document profile 260 using the communications capabilities of the messaging system 240. The recipient of the copy of the document profile may be another file system, another server, or a client system.

Figure 3:
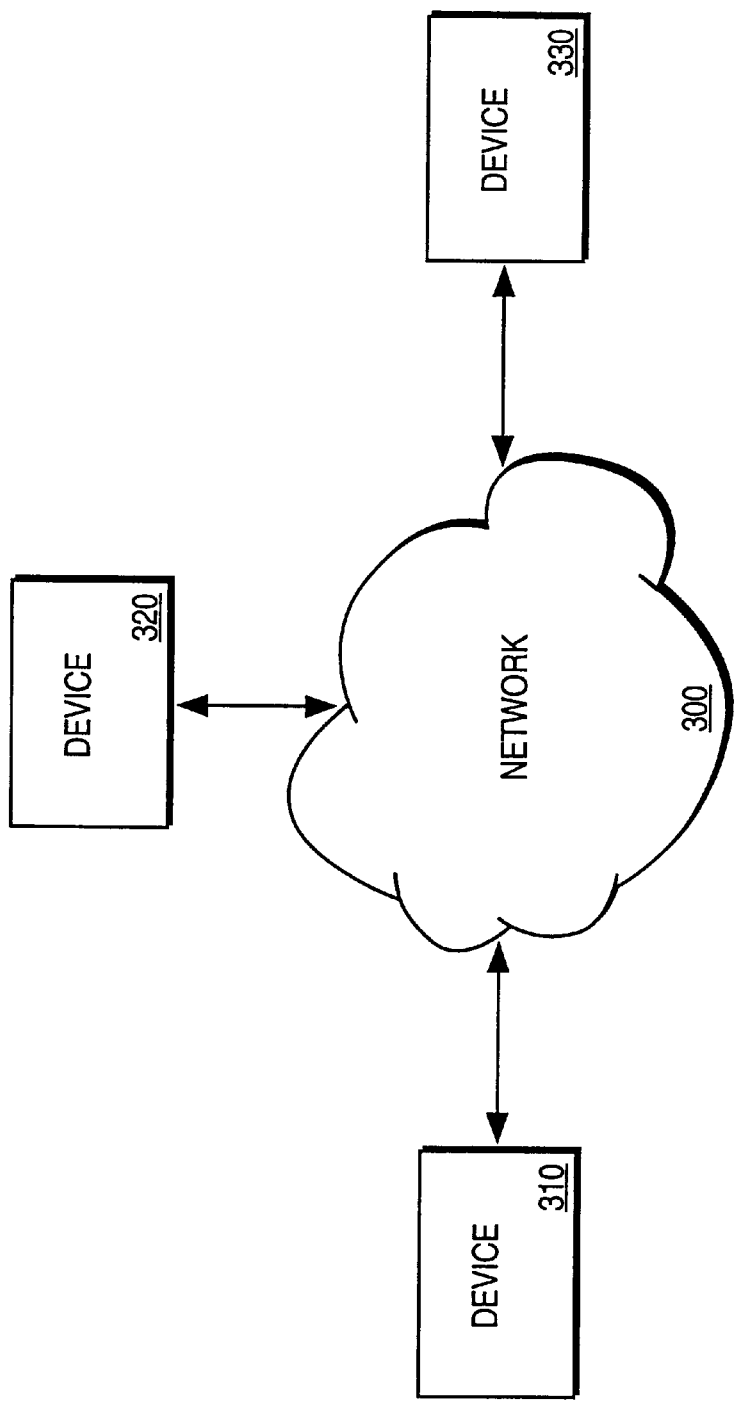
FIG. 3 is a block diagram of a networked computer system on which the present invention may be implemented.

FIG. 3 is an illustration of a typical networked system in which the present invention can be utilized. In this example, a number of devices 310, 320, 330 are interconnected through the network 300. These devices may be clients, or servers. In some cases, a device may act as a client in one instance, and as a server in another. A standard client/server configuration is utilized with the present invention.

Figure 4:
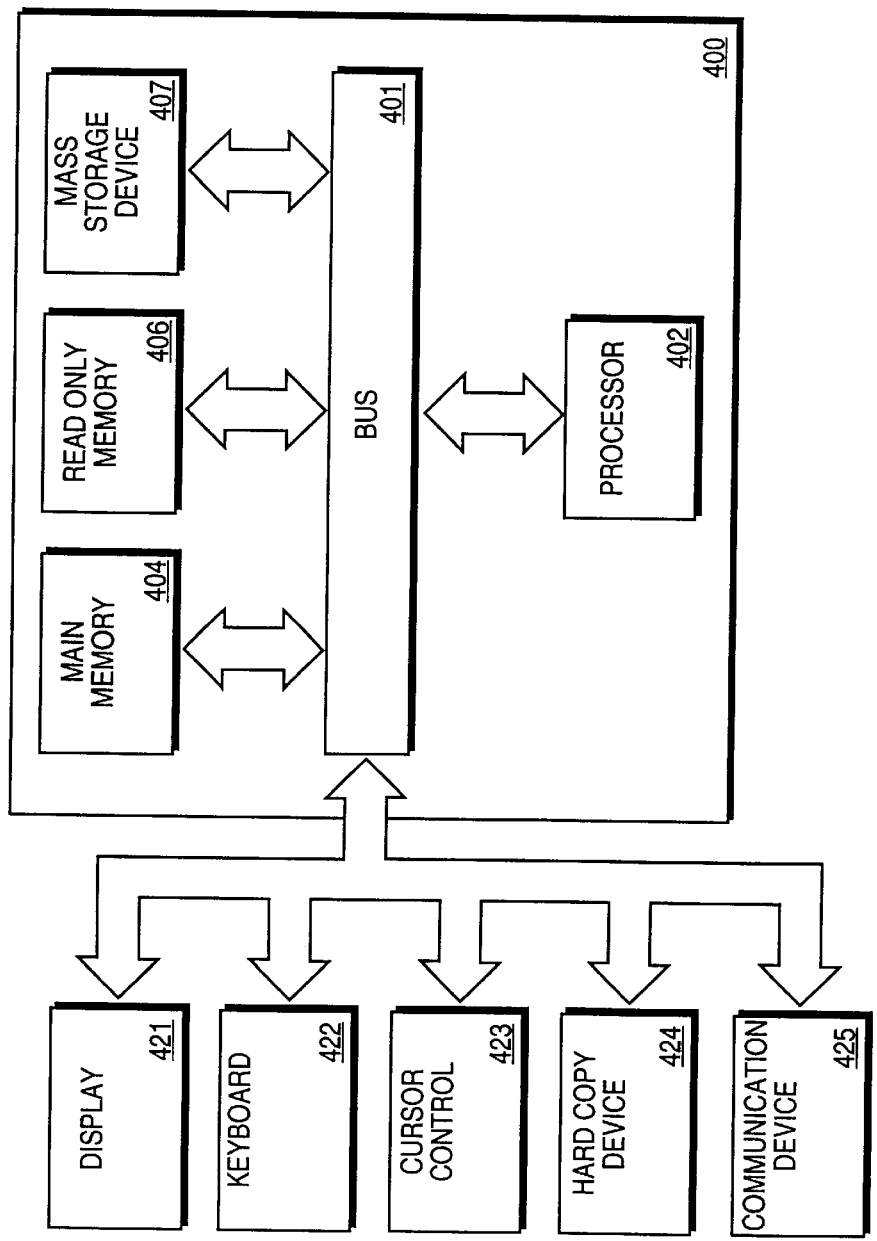
FIG. 4 is a block diagram of a conventional computer system on which the present invention may be implemented.

FIG. 4 is a block diagram of the computer system 400 upon which an embodiment of the present invention can be implemented. Computer system 400 comprises a bus 401 or other communication means for communicating information, and a processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also comprises a read only memory (ROM) and/or other static storage device 406 coupled to bus 401 for storing static information and instructions for processor 402. Data storage device 407 is coupled to bus 401 for storing information and instructions.

A data storage device 407 such as a magnetic disk or optical disk and its corresponding disk drive can be coupled to computer system 400. Computer system 400 can also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device is cursor control 423, such as a mouse, a trackball, or cursor direction keys for communicating direction information and command selections to processor 402 and for controlling cursor movement on display 421. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 422 wherein all interface is provided via the stylus as a writing instrument (like a pen) and the written text is interpreted using optical character recognition (OCR) techniques.

The present invention is related to the use of computer system 400 to manage documents. According to one embodiment, the document management is performed by computer system 400 in response to processor 402 executing sequences of instructions contained in memory 404. Execution of the sequences of instructions contained in memory 404 causes processor 402 to manage documents, as will be described hereafter. In alternative embodiments, hard-wired circuitry may be used in place of or in combination with software instructions to implement the present invention. Thus, the present invention is not limited to any specific combination of hardware circuitry and software.

Figure 5:
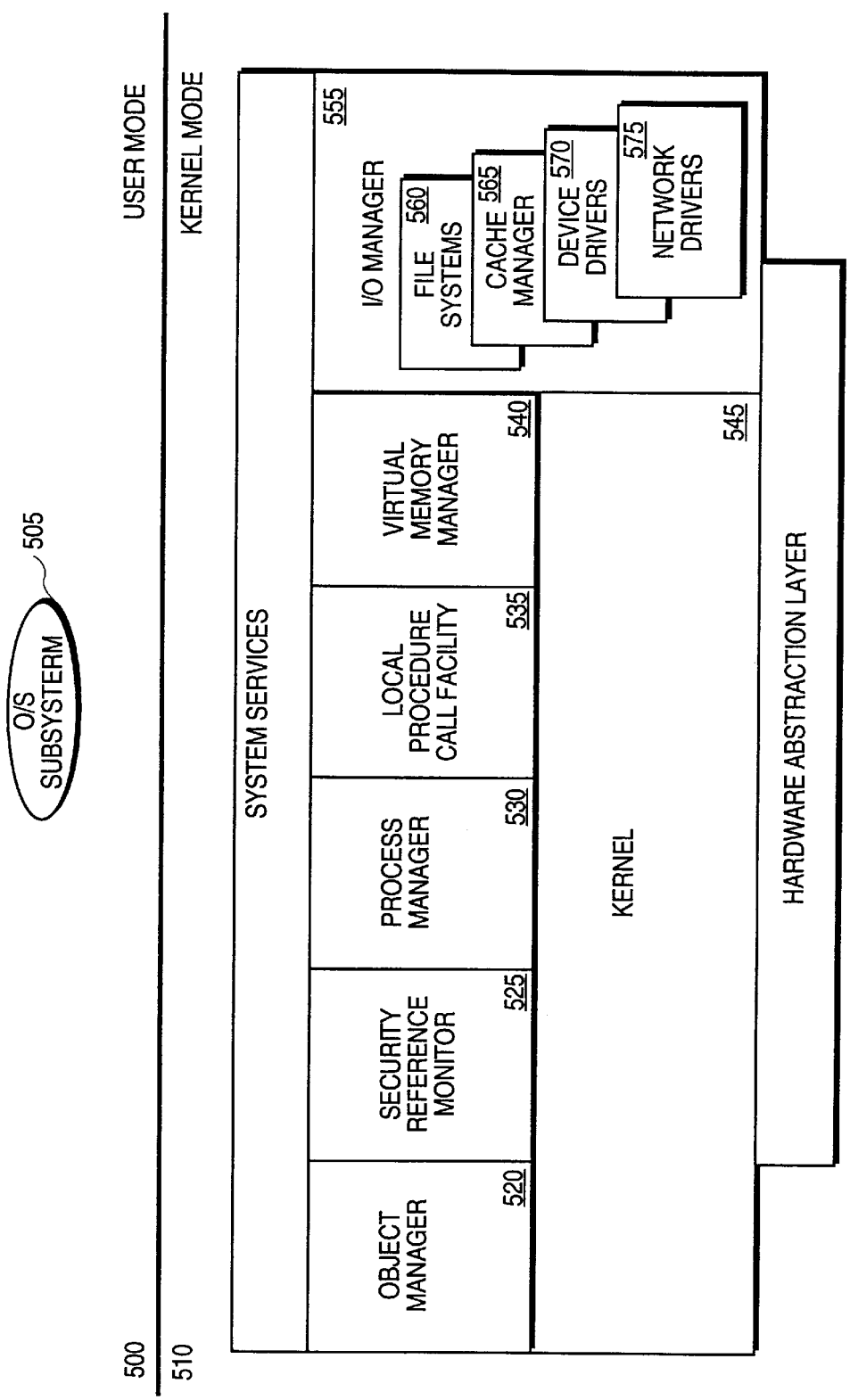
FIG. 5 is an illustration of the system interfaces in a Windows NT operating system.

FIG. 5 is an illustration of the system interfaces in a Windows NT environment. The system is divided into the user mode 500, containing the operating system subsystem 505 and applications, and the kernel mode 510, which contains the system services 515. The kernel mode 510 also contains executive components.

Executive components maintain independence from each other, each creating and manipulating the system data structures it requires. The object manager 520 manages executive objects that are used to represent operating system resources. The security reference monitor 525 enforces security policies in the local computer. The process manager 530 creates processes and threads. The local procedure call facility 535 passes messages between client process and server process on the same computer. The virtual memory manager 540 implements the virtual memory. The kernel 545 responds to interrupts and exceptions, and synchronizes activities between multiple processors. The I/O system processes input from and delivering output to a variety of devices. Specifically, the I/O manager 555 implements device-independent input and output. The file system 560 accepts file-oriented I/O requests and translates them into I/O requests bound for a particular device. The cache manager 565 manages the system cache, and the network drivers 570 are system drivers that transmit and receive remote I/O requests on the network.

The document management system 290 of the present invention is implemented within the user mode 500 of the system. Both the document manager 270 and the messaging system 240 are applications which are part of the user mode 500. The document management system 290 of the present invention utilizes the security monitor 525 to verify user access to documents, as described in more detail with respect to FIGS. 9A and 9B. The file system 560 contains the document contents 230, and additive indexes, described in more detail below.

Figure 6:
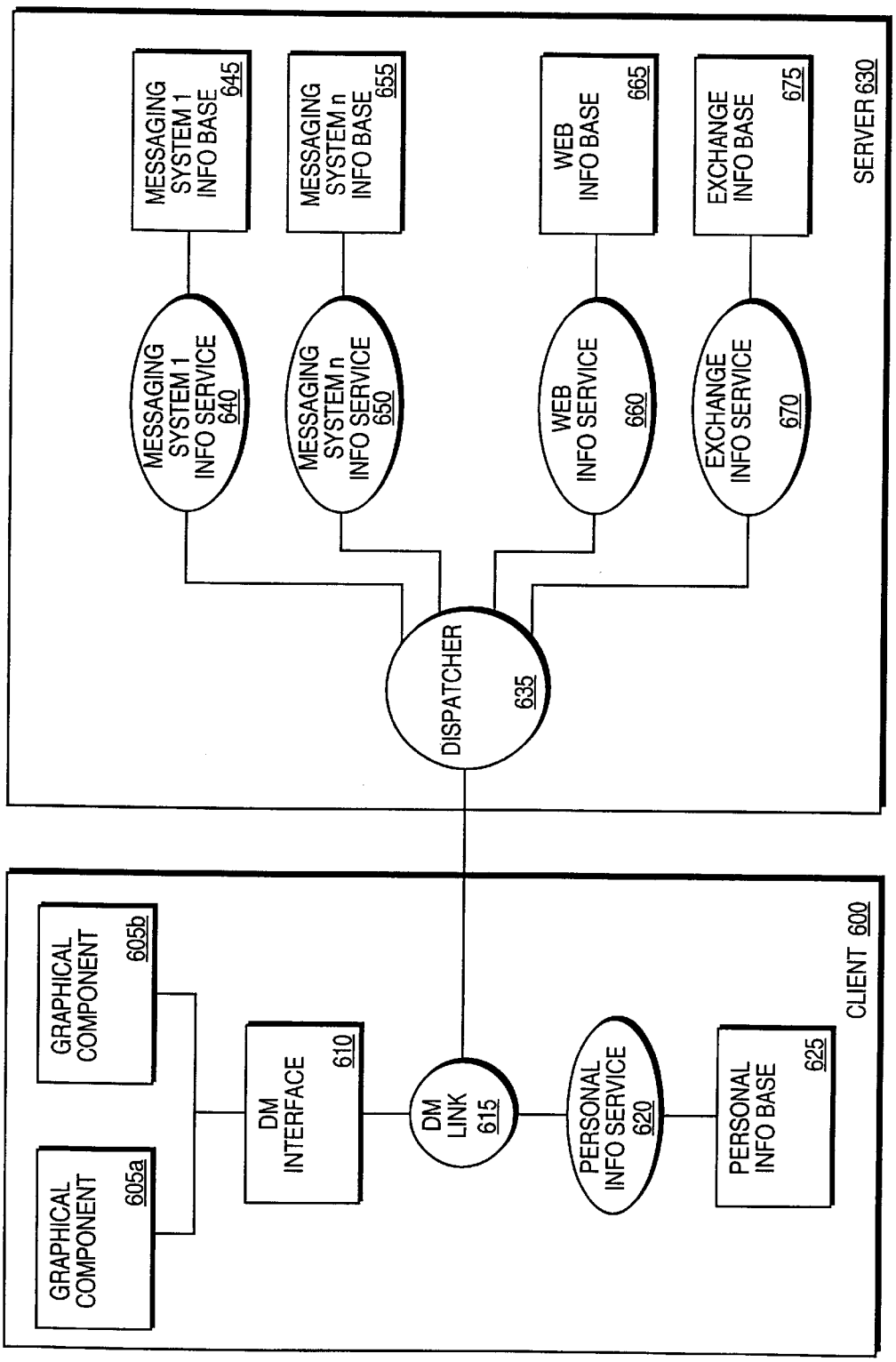
FIG. 6 is a block diagram of the architecture of the present invention.

FIG. 6 is a block diagram of one embodiment of the client-server architecture of the present invention. The client 600 contains the document manager link 615 (DM link), the user interface 610, and a personal information service 625. The DM Link 615 is an automation server, which operates as an object broker. Conventional automation servers automate server processes. The DM link automation server 615 includes eight objects: application, services, rooms, cabinets, drawers, folders, documents and replies. Each object includes four methods: add, delete, list and display. The DM link 615 handles each of these objects, and automates the document management processes. Object brokers are well known to those of ordinary skill in the art.

The DM link 615 allows the user interface 610 to abstract a source of the underlying information presented to the user by the user interface 610. Multiple back-end services act as the sources of the underlying information. The link 615 allows these multiple back end services to be treated homogeneously, making the system easier to use. All information is provided to the link 615 in a defined structure by the back-end processes. The link 615 puts the information together into a single format, and presents the information to the user in a consistent form.

The user interface 610 provides the user with access to the information contained in the system. The user interface is linked to a number of graphical components, such as 605A and 605B. The graphical components 605A and 605B allow the user interface 610 to display figures and drawings to the user. For example, graphical components may include the cabinet shown in FIG. 11A or the navigator shown in FIG. 11B. In one embodiment, the user interface 610 and graphical components 605 are implemented as well known OCX's, OLE control exchanges. This provides high speed screen navigation and a small memory footprint, and allows the components to be included in custom applications.

The personal information service 620 handles checked out documents. The documents checked out or created by the user and not checked in are stored on the local computer of the user, in the personal information base 625. The personal information service 620 allows manipulation of the documents in the personal information base 625.

The server 630 contains at least one information service. The server 630 may have multiple information services 640–675. These information services include for example, message system 1, 640, message system 2, 650, web information service 640 and/or Exchange information service 670. These information services 640–670 are described in more detail below.

There may be a dispatcher 635, if more than one information service is utilized. The dispatcher 635 directs message traffic to one of the available information services 640–670 based on service type and processor or storage device load considerations. The dispatcher 635 connects the server 630 to the DM link 615 in the client 600.

The dispatcher 635 is connected to a number of information services. Each information service has two elements: an information service 640, 650, 660, or 670 and an information base 645, 655, 665, or 675. The information service is the agent that allows interaction with the information contained in the information base.

In the preferred embodiment, one of the information services is the Microsoft™ Exchange Service 670. Microsoft Exchange is a well known messaging system. The Microsoft Exchange Service 670 is coupled with the Microsoft Exchange information base 675 which stores the information used by the Exchange Service 670. When a user queries information stored in the Exchange information base 675, the Exchange Service 670 returns the information to the user.

In an alternative embodiment, one of the information services is the World Wide Web ("the Web") information service 660. The Web information base 665 represents all of the information available on the Web. The Web information service 660 allows the user to access the information on the Web using the same method as used to access information stored on the local server. Thus, using the Web information service 660 allows the user to efficiently access the Web and retrieve information.

The dispatcher 635 selects the appropriate information service to utilize for a query based on computer system load and the selected service type. For example, a query requesting information from a certain server, may only be accessed by the Microsoft Exchange Service 670. In this case, the dispatcher 635 routes the query to the service 670. Alternatively, if there are a number of Microsoft Exchange Services, the dispatcher 635 decides which service to utilize based on which service is least busy (i.e., has fewest pending requests) at the time of the query.

For example, if a user wishes to retrieve some information stored in the messaging system 1 information base 645 (MS1 info base), the process is as follows. The user enters the query at the document manager interface 610. The document manager link 615 formats the query into a predetermined format, and passes the formatted query to the dispatcher 635 in the server 630. Based on the target of the query, the dispatcher 635 directs the query to the MS1 information service 640. The information service 640 queries its info base 645. The response to the query is returned from the info base 645 to the dispatcher 635 through MS1 information service 640. The dispatcher 635 returns the response to the query to the document manager link 615, in the client 600. The document manager link 615 then formats the query response into a predetermined format, and returns the response to the user through the document manager user interface 610. The query response information is then displayed to the user in response to the query. The user need not be aware of the location or source of the information. Thus, even an unsophisticated user is able to access a variety of complex information sources.

In relationship to FIG. 2, the client 280 of FIG. 2 contains the DM link 615, the user interface 610, the graphical components 605, and the personal information service 620 as well as the personal information base 625. The document manager 270 of FIG. 2 contains the dispatcher 635. FIG. 6 contains a number of messaging systems and information bases. FIG. 2 illustrates only one messaging system coupled with one information base. Thus, with respect to FIG. 2, assume that the only messaging system represented is messaging system 1, consisting of messaging system 1 system 640 and the messaging system 1 information base 645. In that case, the messaging system 240 of FIG. 2 is messaging system 1 640. The file system 220 of FIG. 2 contains the messaging system 1 information base 645.

Figure 7:
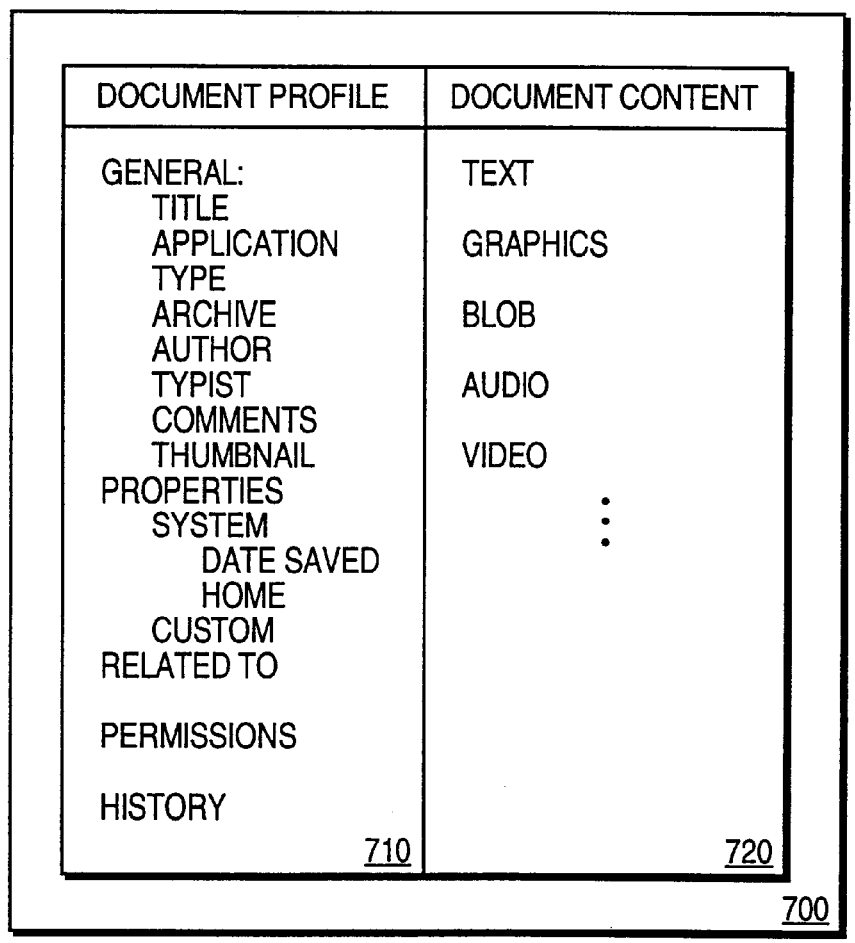
FIG. 7 is an illustration of a document.

FIG. 7 is an illustration of a document 700. A document is a composite of two parts, the document profile 710 and the document content 720. The document content 720 may include any information such as, text, graphics, video, audio, binary large objects (BLOB), etc. As described above, the document content 720 is stored as files in the file system.

The document profile 710 contains the attributes of the document. The document profile 710 may include the title and the application used to create the document. The profile 710 may also include the document type, defined by the user or the system. Document types include: letters, memos, and budgets. When the user is searching for a document, the user may select a certain document type to search. The profile 710 may also include the archive, which represents a period of days determined by the user or document type. When the number of days designated as archive time expires, the document is moved into the archive files or long term storage area from the active files.

The profile 710 may also include the author and typist. Further, the profile 710 may include any comments the user wishes to make regarding the document, as well as a thumbnail sketch. The thumbnail is a miniaturized visual representation of the first page of the document. The thumbnail, however, is not created by the document management system of the present invention. If the application which was used to create the document creates a thumbnail sketch using well know techniques, the profile will take that thumbnail sketch, and display it as part of the document profile.

The document profile 710 may further include system properties. The system properties include the size of the document, date of creation, date of last modification and the home of the document. The home of the document identifies the location of the original document on the file system. The system properties also include custom properties, which may be defined by the user.

The profile 710 may further contain the category of "related to." "Related to" represents other documents which point to this document. For example, an annual report may be related to a number of different documents. The documents may be in the chairman's filing cabinet under a stockholder's meeting folder, in the sales cabinet under a prospect's folder and in the human resources cabinet under hiring documents. The actual document is only located in one place but the "related to" field allows a user to view related documents. The user may add other documents to the list of documents that relate to the selected document. The related to category also makes the user aware of other documents that may be affected when the selected document is changed.

The profile 710 may also include access permissions. The user may define access rights for a particular document. There are different levels of access permission ranging from authorization to see the profile of the document only, to authorization to access and edit the document content, as well as the profile and change the access permissions. Permission may be granted to groups as well as individuals. For example, access to a certain document may be granted to all field staff, representing a group, as well as John Doe and Mark Smith, representing a list of individuals who may or may not be members of the group. The security system 210 of the operating system 200 uses this information to verify whether Tom Jones has access to a document, by determining whether he is a member of a group that has access to the document or one of the named individuals. In this example, Tom Jones would only have access if he is a member of the field staff.

Finally, the document profile 710 contains the access history of the document. Access history includes information defining the user who created the document, and all users who accessed, modified, printed or otherwise had contact with the document. The access history information includes the name of the user, the type of action performed by the user, and the time the user accessed the document.

Figure 8A:
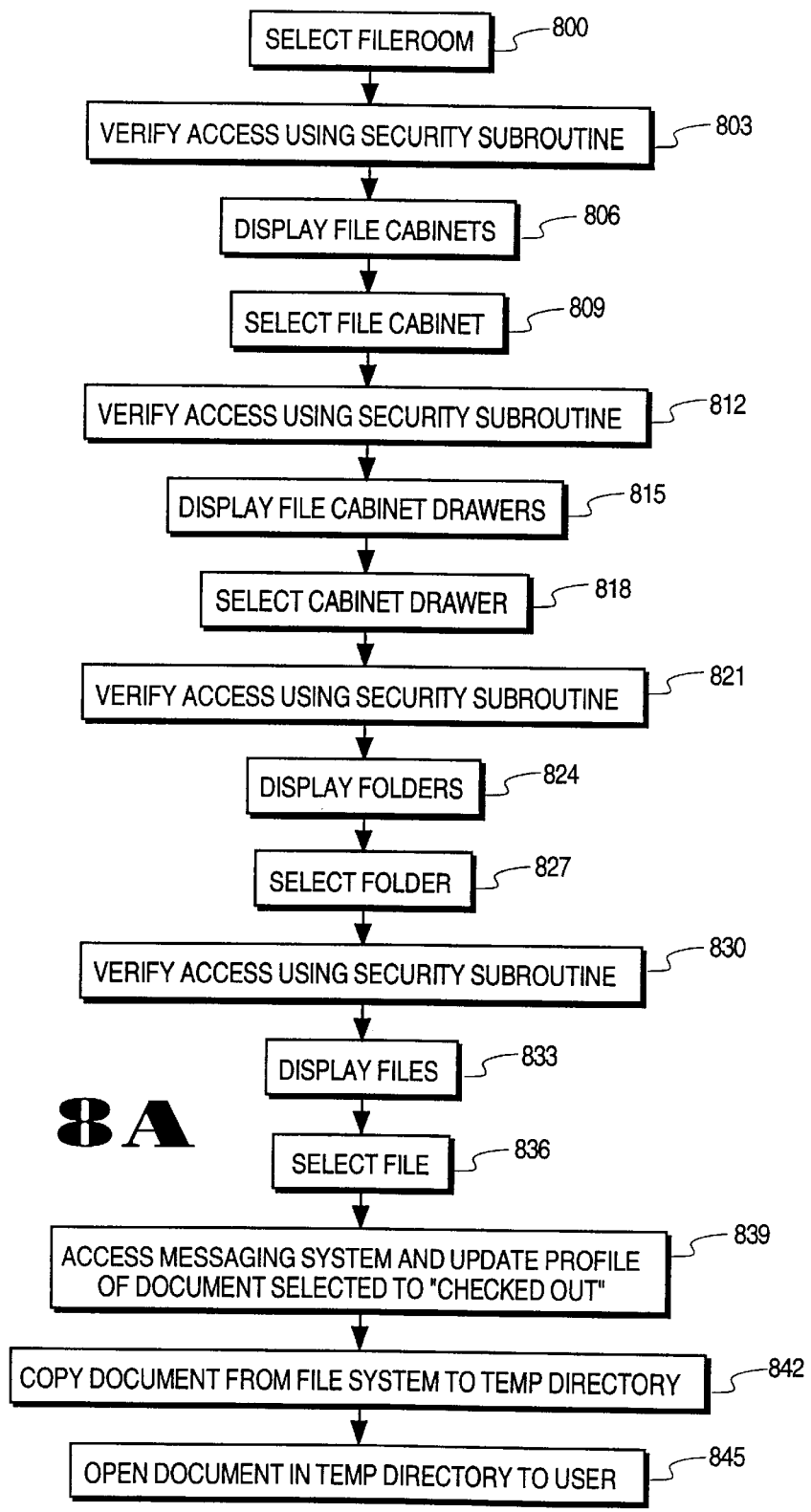
FIG. 8A is a flow chart of opening a document.
Figure 11A:
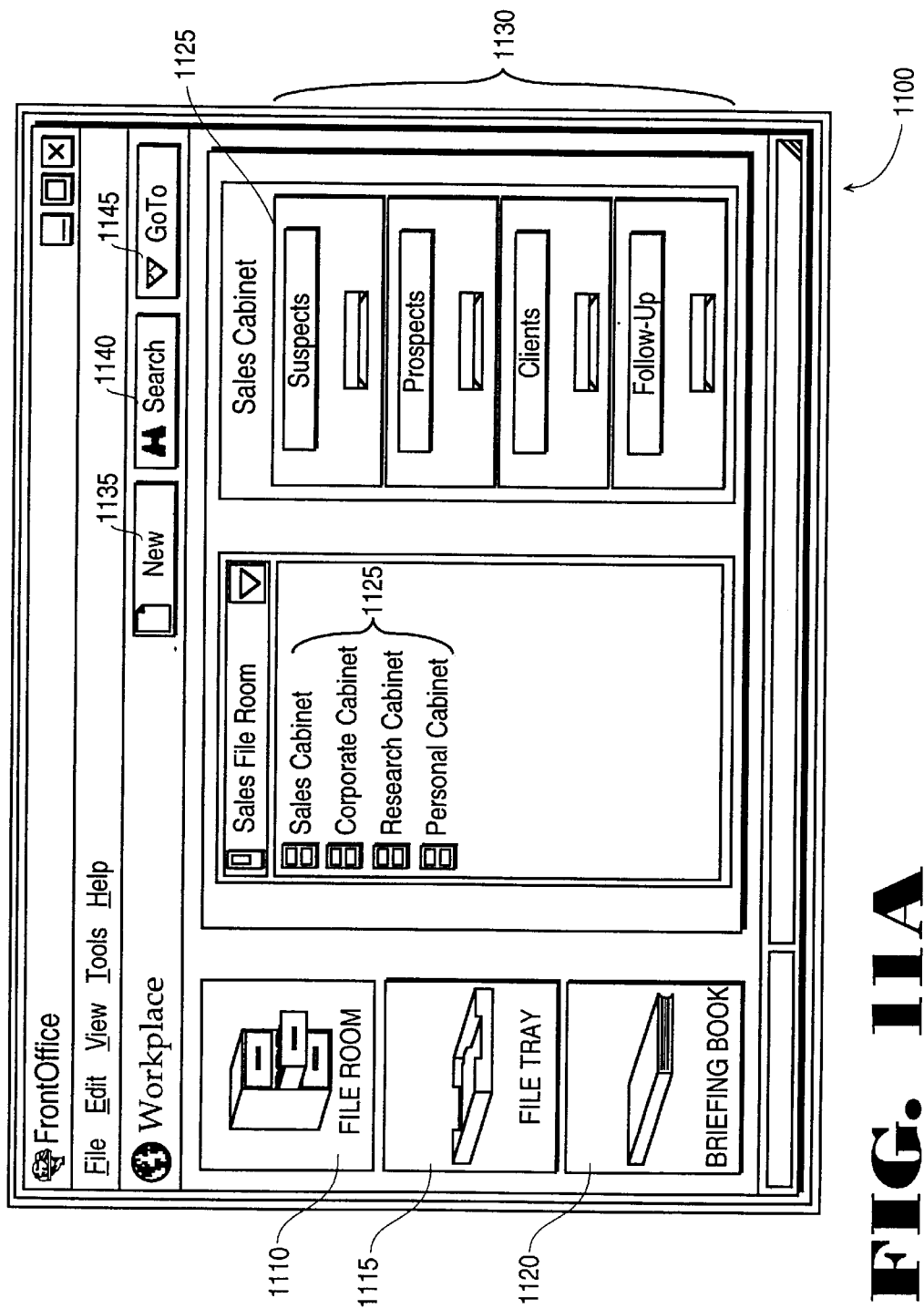
FIG. 11A is an illustration of an embodiment of the user interface.
Figure 11B:
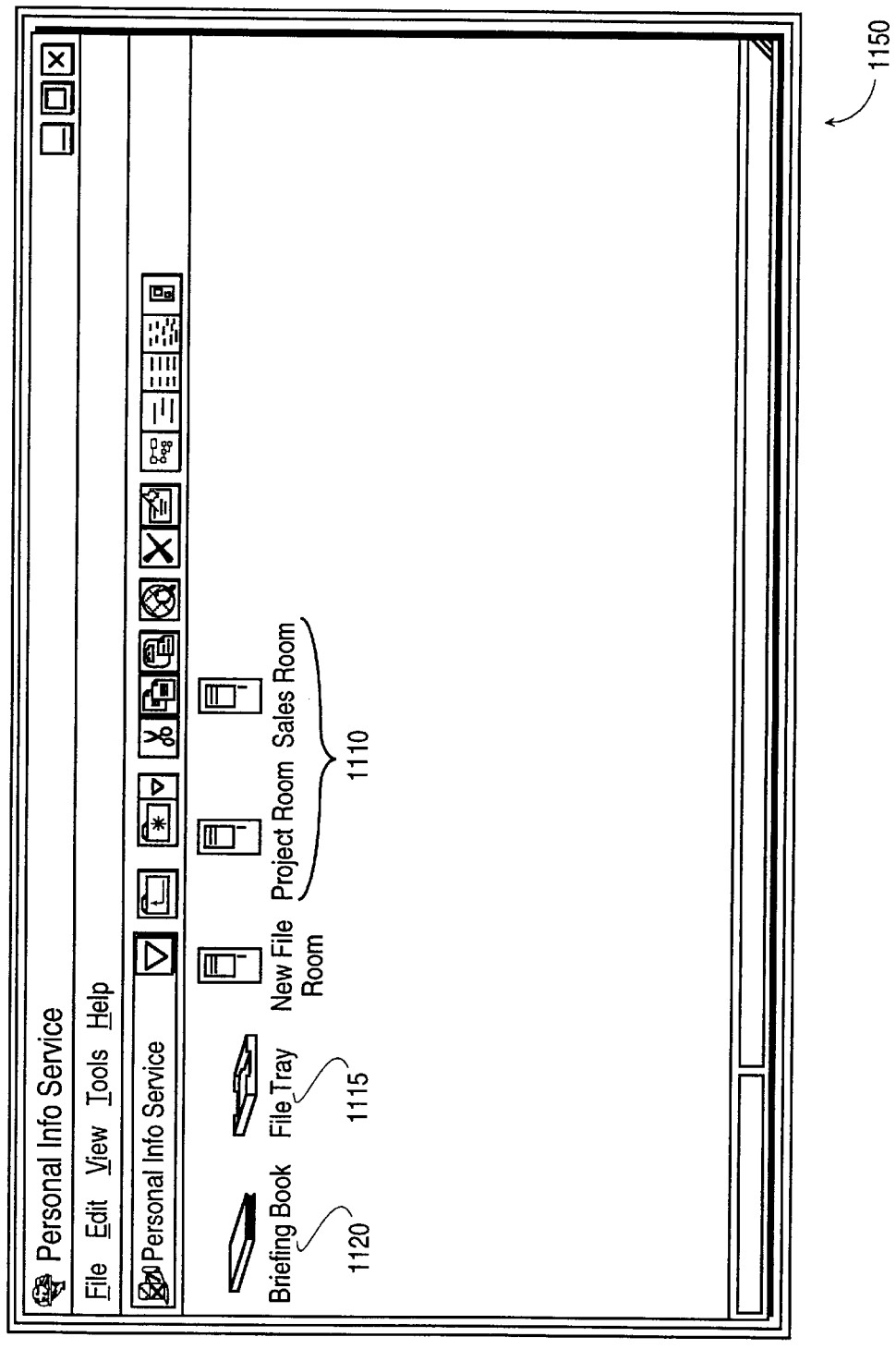
FIG. 11B is an illustration of another embodiment of the user interface.
Figure 11C:
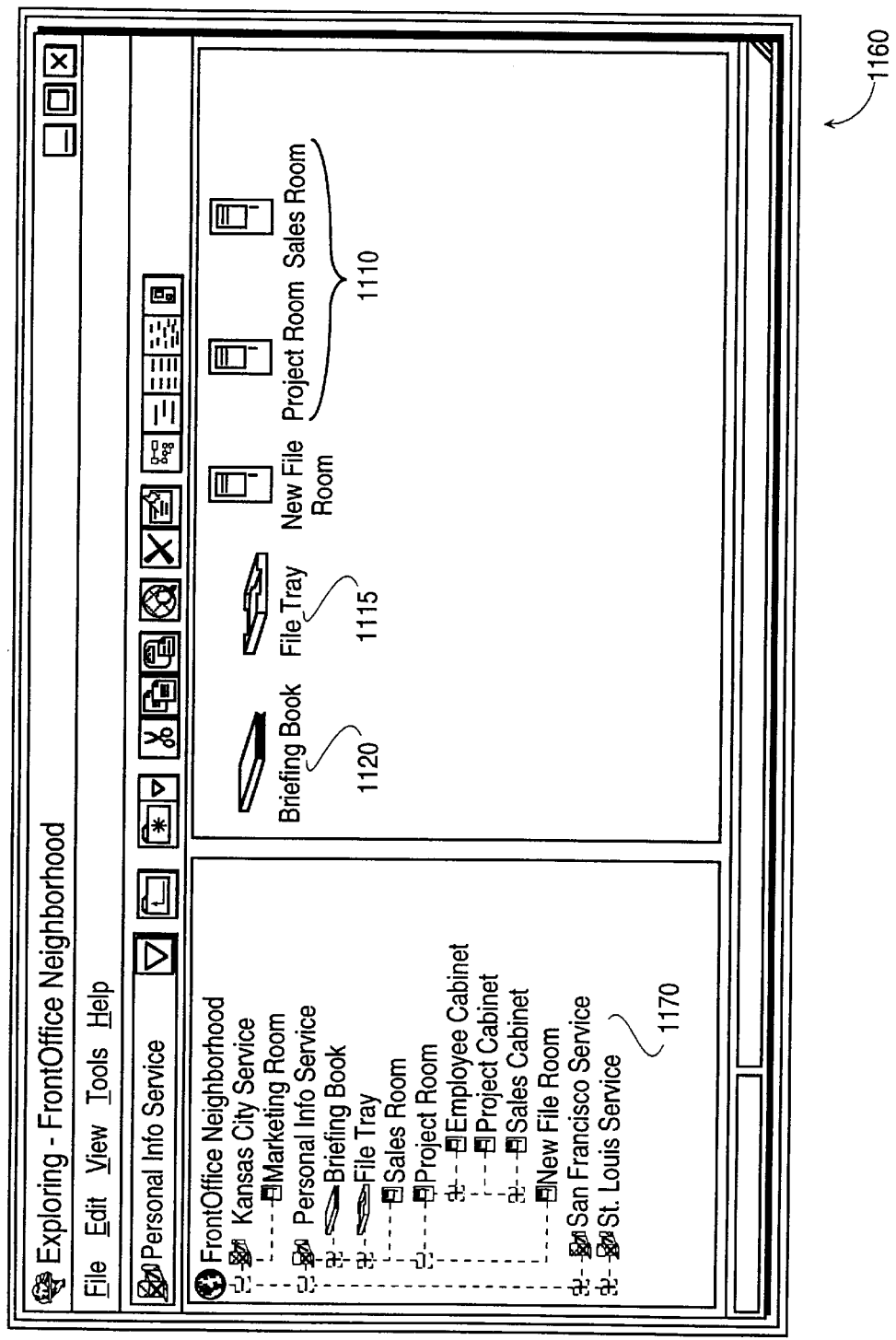
FIG. 11C is an illustration of another embodiment of the user interface.

FIG. 8A shows a flowchart representing the process flow for opening a document or displaying the file hierarchy for the user interface illustrated in FIG. 11C. A file room is selected at step 800. If the user is working in a graphical user interface (GUI), this is done by double clicking on a file room. If the user is using an alternative user interface, this is typically automatically selected by the system, when the file hierarchy display is created.

Figure 9A:
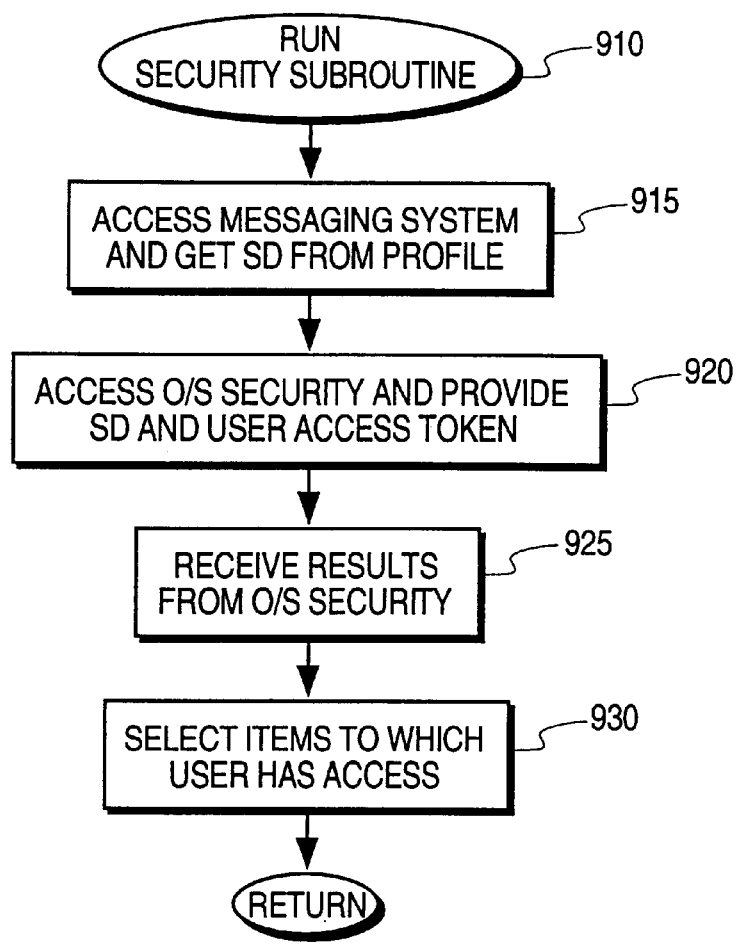
FIG. 9A is a flow chart of one embodiment of a security subroutine.
Figure 9B:
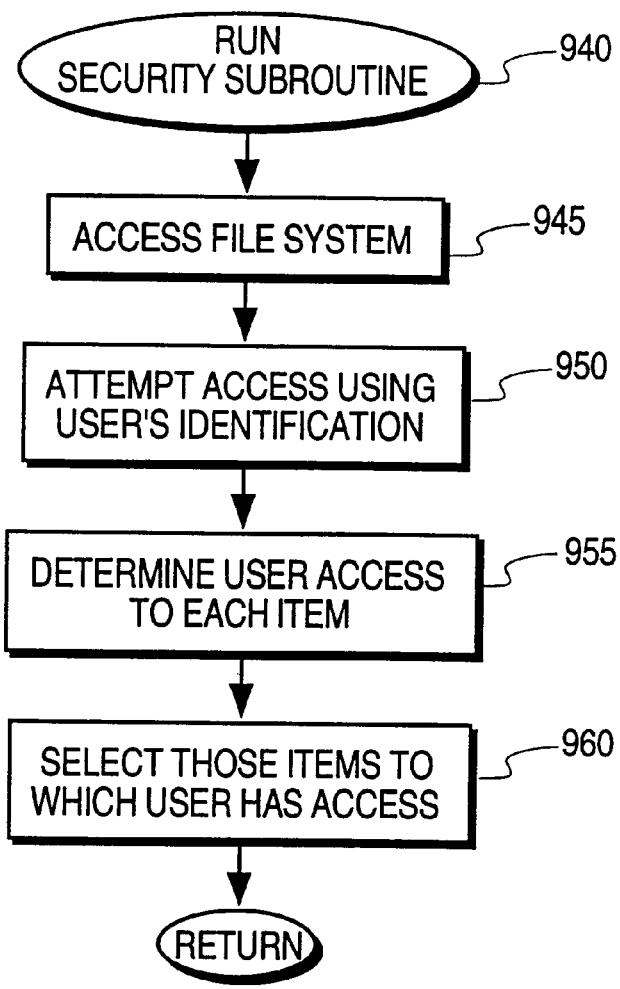
FIG. 9B is a flow chart of an alternate embodiment of a security subroutine.

Access to each of the file cabinets within that file room is verified by security subroutine at step 803, which is illustrated in FIGS. 9A and 9B and described below. The file cabinets to which the user has access are displayed at step 806. If the user is in a GUI, the cabinets are graphically displayed. From these file cabinets, one cabinet is selected at step 809. Access to each of the cabinet drawers within the file cabinets are verified by the security subroutine at step 812. Those cabinet drawers to which the user has access are displayed at step 815. If the user is in a GUI, the drawers are graphically displayed, as illustrated for example by FIG. 11A, Item 1130.

Returning to FIG. 8A, one drawer is selected at step 818 from the drawers available to the user. The security subroutine tests the user's access to each of the folders located within the cabinet selected at step 821. Those folders to which the user has access are displayed at step 824. From these folders, one folder is selected at step 827. The user's access to each of the files within the selected folder is tested using the security subroutine at step 830. The files to which the user has access are displayed at step 833. In a graphical user interface, the user is shown a closed file folder. A file form appears on the outside of the closed file folder. The file form contains database information. Such database information results from an automatic database query on the folder name. Any database information relating to that folder name is collected and displayed on the file form.

For example, a file form may contain the manager of the project, the author, any comments, task status, etc. This database information may be collected from multiple databases. Positioning the file form on the outside of the folder allows rapid access to database information about the folder, without having to execute a variety of searches. When the user opens the file folder, the files to which the user has access are displayed at step 833. In displaying the complete hierarchy, each file room, cabinet, drawer, folder and file is selected in turn by the system. In this way, all objects on all levels to which the user has access are displayed.

When opening a document, the user selects one file to be opened from the displayed files at step 836. Since the system has already verified that the user has access to the file, no access verification is necessary at this point. The messaging system 240 is accessed and the profile 260 of the document selected is updated to "checked out" at step 839. The profile is updated to checked-out in order to prevent others from using the file at the same time. The file system 220 is accessed, and the document content is copied from the file system to a temporary directory at step 842. The document is then opened within that temporary directory and the user has access to the document at step 845. The user then can alter the document.

Figure 8B:
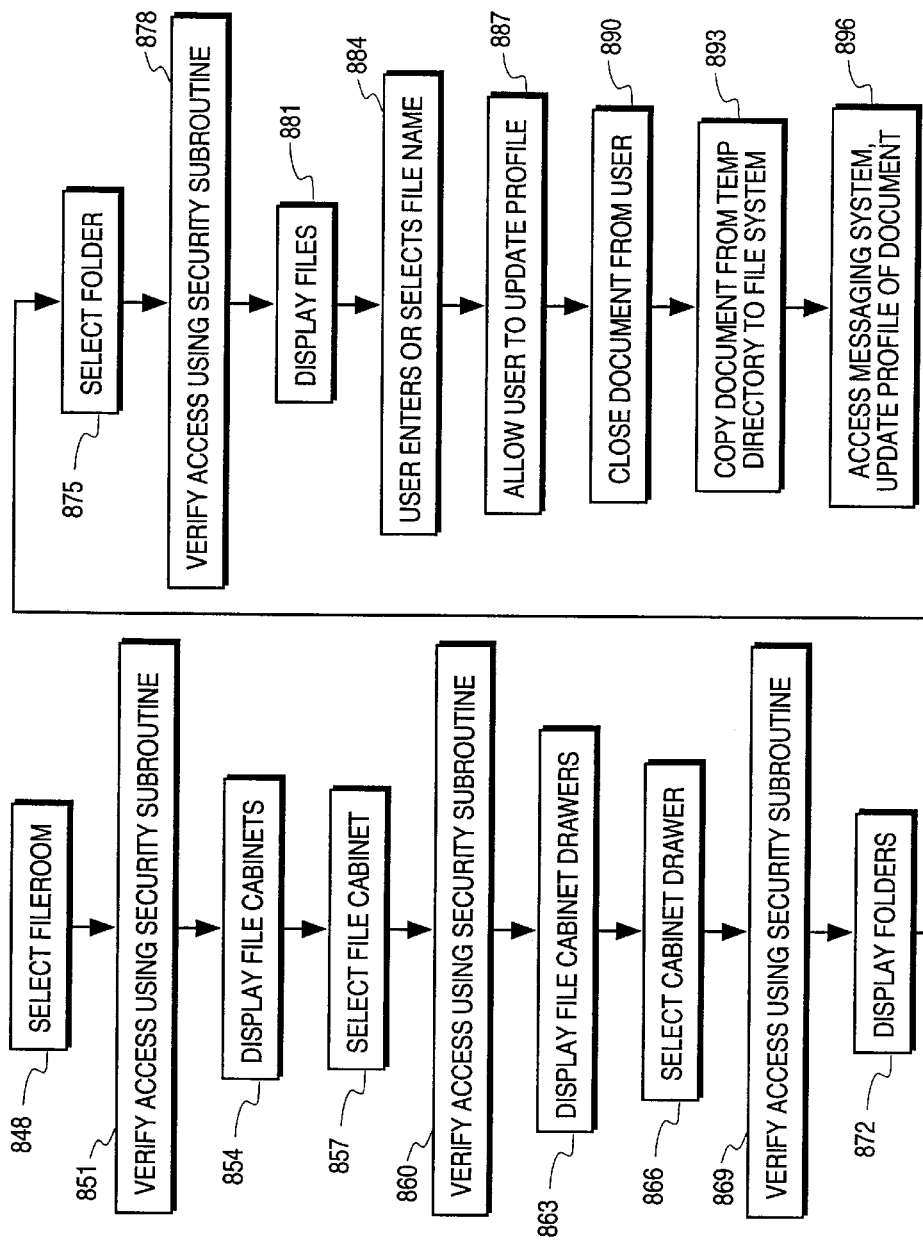
FIG. 8B is a flow chart of closing a document.

FIG. 8B shows a flowchart representing the process flow for closing a document. A file room is selected at step 848. If the user is working in the graphical user interface, the user may select the file room by double clicking on a file room. If the user is using an alternative user interface, this is typically automatically selected by the system, when the file hierarchy display is created.

Access to each of the file cabinets within that file room is verified by security subroutine at step 851, which is illustrated in FIGS. 9A and 9B. The file cabinets to which the user has access are displayed at step 854. If the user is in a GUI, the cabinets are graphically displayed. From these file cabinets, one cabinet is selected at step 857. Access to each of the cabinet drawers within the file cabinets are verified by the security subroutine at step 860. Those cabinet drawers to which the user has access are displayed at step 863. If the user is in a GUI, the drawers are graphically displayed, as illustrated for example by FIG. 11A, Item 1120.

Returning to FIG. 8B, one drawer is selected from the drawers available to the user at step 866. The security subroutine tests the user's access to each of the folders located within the cabinet selected at step 869. Those files to which the user has access are displayed at step 872. From these folders, one folder is selected at step 875. The user's access to each of the files within the selected folder is tested using the security subroutine at step 878. The files to which the user has access are displayed at step 881. As described above, in a graphical user interface the user is shown a closed file folder with a file form on the outside of the file folder, containing database information. When the user opens the file folder, the list of files to which the user has access are displayed at step 881.

The user then enters a new file name at step 884. Alternatively, the user can select an already existing file name at step 884. The messaging system is then accessed and a profile form is displayed, allowing the user to update the profile at step 887. The basic information in the profile is filled in by the system. However, the user may alter it. For example, the user may have typed the document for someone else and therefore the writer may not be the user. The user can also add comments. If the user is the owner of the document or has permission to alter basic settings, the user may also add or change the permissions for access to the document.

The document is then closed from the user at step 890, and copied from the temporary directory to the file system at step 893. If the document is an old document that was modified by the user and saved under the same name, the new document is saved as a new version. The older version of the document is retained.

The document contents are then copied from the temporary directory to the file system at step 893. Then the messaging system is accessed and the profile of the document is updated at step 896. This may include adding to the history of the document that the document has been checked out and/or checked in, changing the version number, updating information about document size, etc. Checking in the document also updates the document content index and the document profile index, described in more detail below.

FIG. 9A shows a flow chart of one embodiment of the security subroutine. When a user first logs into the computer system, the user provides his or her user identification. This user identification, coupled with the log-in information describing the identity of the system (i.e. computer) the user is on, together form the security identification (SID) or user token for the user. The user token is created by a conventional operating system.

When a new document is created, the user sets access rights for the document. This is illustrated in FIG. 7, document profile 710, as "permissions." The list of users and groups who have access to the document (i.e., the document "permissions") is given to the O/S security system 210 by the document manager 270 when the document is checked in. The O/S security system 210 compiles a list of all access control entries (ACE's) creating an access control list (ACL). An ACE is the combination of the security ID of users and masks defining the level of access of each user to the document. This ACL, along with a discretionary ACL, which is the binary flag allowing or prohibiting access, and the system ACL, which audits the propriety of the access after it occurs together from the security descriptor (SD). This security descriptor is binary data, and is attached to the profile of the document.

When a user attempts to access a document, only those documents to which the user has access are displayed. The security subroutine verifies the user's access to the document. The security subroutine is invoked at step 910 by the document managing system 290 of the present invention.

The system accesses the messaging system and retrieves the security descriptor from each document profile that the user is trying to access at step 915. The security descriptor and the user token are passed to the O/S security system at step 920. The operating system security interprets the security descriptor to identify the level of access of each user, and compares that access level to the user's token. Based on that information, the O/S security returns yes/no authorization for each document access at step 925. All items to which the user has access are then selected at step 930, and the security subroutine returns this information to the invoking program.

FIG. 9B shows an alternative embodiment of the security subroutine. The security subroutine is invoked at step 940 by the document management system 290 when a user attempts to open a document, close a document, or display a file hierarchy. The document management system of the present invention accesses the file system at step 945. The user's SID is used to attempt access to the documents which the user is trying to display at step 950. A list of documents which the user's SID was qualified to access is returned at step 955. A list of those documents to which the user has access are selected at step 960. The security subroutine then returns the user to the invoking program.

Figure 10:
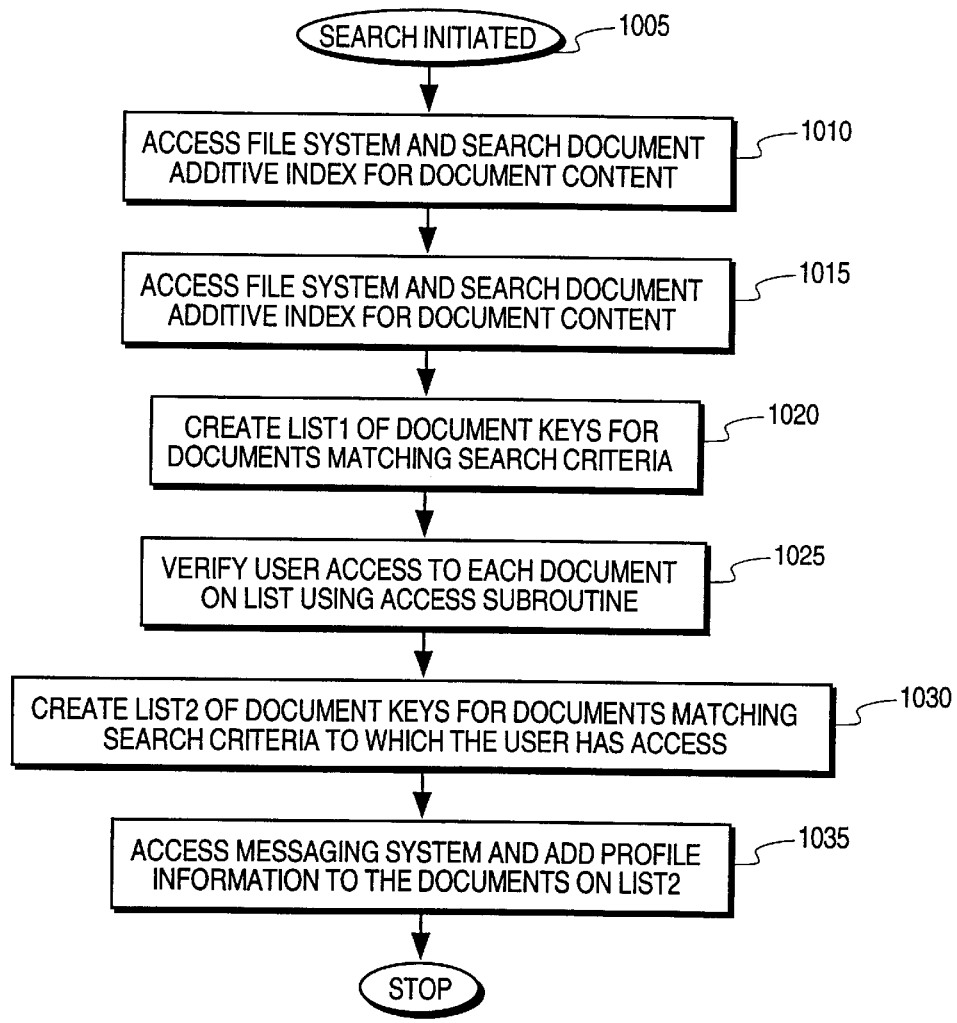
FIG. 10 is a flow chart of a search in the present system.

FIG. 10 is a flow chart representing the process flow for a search request executed by the system upon user request 1000. When a user requests a search, a dialog box is displayed. The dialog box allows the user to enter a number of search criteria. The criteria may be words within the document, or any information contained within the profile, including author, title, type of document, date created, size, etc. For example, the user may wish to search for all documents of type contract, which contain the word patent.

When a new document is entered into the document management system of the present invention, or checked in as described above, two indexes are created. The document content is indexed, indicating the occurrence of each word or other searchable term within the document. The document profile is also indexed, based on each profile category described above with respect to FIG. 7, profile 710. An additive index of document contents and a separate additive index of document profiles are created and stored in the file system 220. The additive index is a cumulative index for all documents. In one embodiment, the additive indexes are only updated with any new documents that may have been added to the system when a search is executed on the index. That is, each time a search is initiated, before the search is executed, the additive indexes are updated. A search is divided into two parts: the document content and the document profile are searched separately.

The search is executed by accessing the file system 220 and searching the document content additive index 1010 for search criteria regarding information within the document. The profile additive index is searched 1020 for search criteria regarding information about the attributes of the document, described above with respect to FIG. 7, profile 710. For the above example, the document content additive index would be searched for the occurrence of the word "patent," and the profile additive index would be searched for all documents of type "contract."

The system then compiles a list of document keys for documents matching all search criteria 1020. A document key consists of a document identifier and a service identifier. The document identifier identifies the location of the document content within the file system. The service identifier identifies the server site at which the document is located. At this point the result is just a list of numbers. For example, the result of the above search may be document 200, document 32, and document 48.

The user's access to each of the documents on the list is verified 1025. The access verification is performed by the security subroutine described above with respect to FIG. 9A or FIG. 9B.

A list of document keys for documents which match the criteria and to which the user has access is compiled 1030. The messaging system 240 is accessed and profile information is added to this list of document keys 1035. For example, the profile information can be title, author, and date created.

The list of documents matching the search criteria, and verified to be accessible to the user are displayed. The user may select any document from this list. Double clicking on a document in this list displays the profile information of the selected document. The user may open any of the documents in the displayed list if the user is authorized to do so. If the user opens a document, the procedure illustrated in FIG. 8A is followed.

FIG. 11A is an illustration of one embodiment of the document managing system user interface 1100, known as "workplace". The interface 1100 is a visual representation of a document hierarchical organization as well as the other functionalities of the present invention. In order to access a document the user selects the file room 1110. The file room 1110 is the uppermost tier of organization of documents. For example, the file rooms can be divided into a sales file room, a management file room, a quality assurance file room, a human resources file room or any other division that the user may find useful. Once the user selects a file room 1110, the cabinets 1125 within that file room 1110 are displayed. These cabinets 1125 are a further subdivision one tier down from file room 1110. For example, for a sales file room, the cabinets may be sales cabinet, corporate cabinet, research cabinet and personal cabinet. The user may select one of these cabinets 1125. The cabinet drawers 1130 of the cabinet selected are displayed on the right hand side of the screen. The drawers 1130 are further subdivisions which may be named by the user. For example, for a sales cabinet, the drawers may be the suspects, the prospects, the current clients and follow up. Upon selecting one of the cabinet drawers 1130, a list of file folders is displayed graphically. From these file folders, the user may choose any file folder. As discussed above, the outside of the file folder shows a file form containing database information. Upon choosing the file folder, the documents contained within the file folder are displayed.

The file tray 1115 manages all personal documents and is divided into sections, including local documents, recently used documents and favorite places. Local documents are documents that have been checked out by the user or documents created by the user and not checked in. Recently used documents include a list of all the documents that the user has recently accessed, in chronological order. The length of the list may be set by the user. Favorite places are documents that the user has determined are important. Favorite places is a list of bookmarks, files that the user can access directly without navigating through the file hierarchy. For example, a user regularly accesses a file listing the purchases of a certain company, stored in the company's folder, in the current clients cabinet drawer, in the sales cabinet, in the sales file room. The user could store the file as a favorite place, and could access it through the file tray with a single click without having to step through the hierarchy.

The briefing book 1120 allows the user to subscribe to information that is being published within the document management system 290. Information within the briefing book 1120 is organized into sections. For example, sections could be news of interest, meetings scheduled, reports or any other category of data that is regularly updated and should be up-to-date to be useful. Within each section there are a number of documents. Once again, the documents in the section are organized hierarchically. For example, the news of interest section could include press releases, news from the CEO, the current company newsletter, etc. The briefing book 1120 automatically updates such documents by accessing the original of the document, and determining whether the document in the briefing book 1120 is the most current. In one embodiment the updating occurs based on a stored search based of the document location. If the document is up-to-date nothing is changed. However, if the document has changed, the new updated document is placed in the briefing book 1120. The updating may occur at any time, or times, set by the user. Settings for update times may vary based on user preferences.

At any level within the file room all the way to folder, the user may press the "new" button 1135 and create a new document. The user may also press the "search" button 1140. Selecting the search button displays a tabbed form in which the user can enter search data. For a more detailed description see FIG. 10 and the accompanying text above. The go to or favorites button 1145 allows the user to access a certain file without having to go through the hierarchy by selecting one of the documents of the list of favorite places, described above.

FIG. 11B displays an alternative embodiment of a user interface for the document management system 290 of the present invention, also known as the "neighborhood". This interface is configured similarly to the Windows 95™ network neighborhood developed by Microsoft Corporation. The neighborhood is a large icon in the Windows desktop and when selected displays the representation shown in window 1150. As discussed above, the briefing book 1120, file tray 1115, and file rooms 1110 are shown as icons. Selecting the "new file room" icon allows the user to create a new file room. Upon selecting any one of these icons, a new window showing only the icons for that particular level is displayed.

FIG. 11C is another alternative embodiment of a user interface of the present invention. This interface is designed for the expert Windows 95 user and it displays a hierarchical tree of available information 1170. Additionally, this interface also displays, like the previous embodiment shown in FIG. 11B, the graphical representation at each level. However, in this embodiment 1160, the user may select an item at any level of the hierarchy without having to step through individual levels.

A method and apparatus for document management has thus been described. While the present invention has been described in particular embodiments and through particular examples, the invention should not be construed as limited by such embodiments and examples, but rather construed according to the following claims.

What is claimed is:

1. A computer-implemented method for managing documents, comprising the steps of:
    storing content of a document on a file system;
    storing a profile of said document in a messaging system;
    obtaining said profile upon request for access to said document; and
    accessing said content of said document based upon information obtained from said profile.

2. The computer-implemented method according to claim 1 wherein said profile includes information about attributes of said document.

3. The computer-implemented method according to claim 2 wherein said information about said attributes includes indicating location of said document content on said file system.

4. The computer-implemented method according to claim 1 wherein said document content comprises one or more of text, data, figures, binary large object (BLOB), audio, or video.

5. The computer-implemented method according to claim 1 further comprising the step of:

indexing said document; and
adding said index to an additive index of documents.

6. The computer-implemented method according to claim 5, wherein said indexing comprises the steps of:
    indexing said document content; and
    indexing said document profile.

7. The computer-implemented method according to claim 6 wherein adding said index to said additive index of documents comprises the steps of:
    adding said document content index to a document content additive index; and
    adding said document profile index to a document profile additive index.

8. The computer-implemented method according to claim 7 further comprising the steps of:
    receiving a user search request;
    executing said user search request; and
    displaying a result of said user search request.

9. The computer-implemented method according to claim 8 wherein said step of executing said user search request further comprises the step of:
    searching said document content additive index; and
    searching said document profile additive index.

10. The computer-implemented method according to claim 8 wherein said step of displaying said result comprises:
    accessing said file system and attempting to retrieve a first document in said result using a user identification; and
    displaying said document if said user identification is qualified to receive said document based on access rights.

11. The computer-implemented method according to claim 10 wherein said step of displaying said document further comprise the steps of:
    utilizing said profile to retrieve displayable information about said document; and
    displaying said displayable information.

12. The computer-implemented method according to claim 1 wherein said method is a document management system integrated into an operating system.

13. The computer-implemented method according to claim 12 wherein said operating system is a Windows operating system.

14. The computer-implemented method according to claim 1 further comprising the step of:
    maintaining a list of favorite documents.

15. The computer-implemented method according to claim 14 wherein said list of favorite documents comprises pointers to a location of documents in said list.

16. The computer-implemented method according to claim 1 further comprising the step of:
    maintaining a list of regularly updated documents; and
    updating documents in said list of regularly updated documents automatically.

17. The computer-implemented method according to claim 16 wherein said updating comprises the steps:
    saving a search for each of said documents in said list of regularly updated documents; and
    executing said search on a predetermined schedule.

18. A computer-implemented method for managing documents, comprising the steps of:
    storing content of a document on a file system;
    storing a profile of said document in a messaging system; and maintaining a list of favorite documents, wherein said list of favorite documents comprises pointers to a location of documents in said list.

19. A computer system, having a processor, comprising:

a document management system;

a file system coupled to said document management system, wherein said file system is configured to store a document content;

a messaging system coupled to said document management system, wherein said messaging system is configured to store a document profile;

an operating system security system; and said operating system security system being configured to determine access rights to a document stored on said file system.

* * * * *